(12) United States Patent
Barth et al.

(10) Patent No.: US 7,558,366 B2
(45) Date of Patent: Jul. 7, 2009

(54) TOMOSYNTHETIC IMAGE RECONSTRUCTION METHOD, AND DIAGNOSTIC DEVICE OPERATING ACCORDING TO THE METHOD

(75) Inventors: Karl Barth, Höchstadt (DE); Wolfgang Haerer, Erlangen (DE); Thomas Mertelmeier, Erlangen (DE); Karl Wiesent, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 300 days.

(21) Appl. No.: 11/685,280

(22) Filed: Mar. 13, 2007

(65) Prior Publication Data

US 2007/0217569 A1 Sep. 20, 2007

(30) Foreign Application Priority Data

Mar. 17, 2006 (DE) .................. 10 2006 012 407

(51) Int. Cl.
*A61B 6/04* (2006.01)
*H05G 1/60* (2006.01)

(52) U.S. Cl. .................. 378/27; 378/21; 378/22; 378/197

(58) Field of Classification Search ............ 378/21, 378/22, 23, 24, 25, 26, 27, 37, 196, 197, 378/198
See application file for complete search history.

(56) References Cited

U.S. PATENT DOCUMENTS

| | | | | |
|---|---|---|---|---|
| 5,872,828 A * | 2/1999 | Niklason et al. | ............... | 378/23 |
| 6,028,910 A * | 2/2000 | Kirchner et al. | ............... | 378/22 |
| 6,125,163 A | 9/2000 | Barth et al. | | |
| 6,442,288 B1 | 8/2002 | Haerer et al. | | |
| 6,674,835 B2 * | 1/2004 | Kaufhold et al. | ............... | 378/53 |
| 6,707,878 B2 * | 3/2004 | Claus et al. | ................... | 378/22 |
| 6,751,285 B2 * | 6/2004 | Eberhard et al. | ............... | 378/37 |
| 6,987,829 B2 * | 1/2006 | Claus | .......................... | 378/23 |
| 7,310,436 B2 * | 12/2007 | Li et al. | ...................... | 382/131 |
| 7,356,113 B2 * | 4/2008 | Wu et al. | ...................... | 378/27 |
| 2005/0113681 A1 * | 5/2005 | DeFreitas et al. | ........... | 600/426 |

OTHER PUBLICATIONS

"Digital X-Ray Tomosynthesis: Current State of the Art and Clinical Potential," Dobbins III et al., Phys. Med. Biol. Vo. 48 (2003), R65-R106.
"Digital Tomosynthesis in Breast Imaging," Niklason et al., Radiology Vo. 205 (1997), pp. 399-406.
"Evaluation of Linear and Nonlinear Tomosynthetic Reconstructions Methods in Digital Mammography," Suryanarayanan et al., Acad. Radiol. Vo. 8, (2001) pp. 219-224.
"Practical Strategies for the Clinical Implementation of Matrix Inversion tomosynthesis (MITS)," Godfrey et al., Medical Imaging 2003, Physics of Medical Imaging, Proc. SPIE, vol. 5030 (2003) pp. 379-389.

(Continued)

*Primary Examiner*—Allen C. Ho
(74) *Attorney, Agent, or Firm*—Schiff Hardin LLP

(57) ABSTRACT

In a tomosynthetic image reconstruction method and diagnostic device operating with such a method, a tomosynthetic 3D x-ray image is reconstructed by a discrete filtered back projection from a number of individual digital projection data recorded from different project angles within a restricted angular range, in which at least one filtering is performed with a convolution kernel that, in the local area outside of its central value, corresponds to an exponential function.

8 Claims, 3 Drawing Sheets

OTHER PUBLICATIONS

"Tomographic Mammography Using a Limited Number of Low-Dose Cone-Beam Projection Images," Wu et al., Med. Phys. vol. 30, No. 3 (2003), pp. 365-380.

"A Comparison of Reconstruction Algorithms for Breast Tomosynthesis," Wu et al., Med. Phys. vol. 31, No. 9 (2004) pp. 2636-2647.

"A Theoretical Framework for Filtered Backprojection in Tomosynthesis," Lauritsch et al., Proc. SPIE 3338 (1998) pp. 1127-1137.

"Practical Cone-Beam Algorithm," Feldkamp et al., J. Opt. Soc. Am., vol. 1, No. 6 (1986), pp. 612-619.

\* cited by examiner

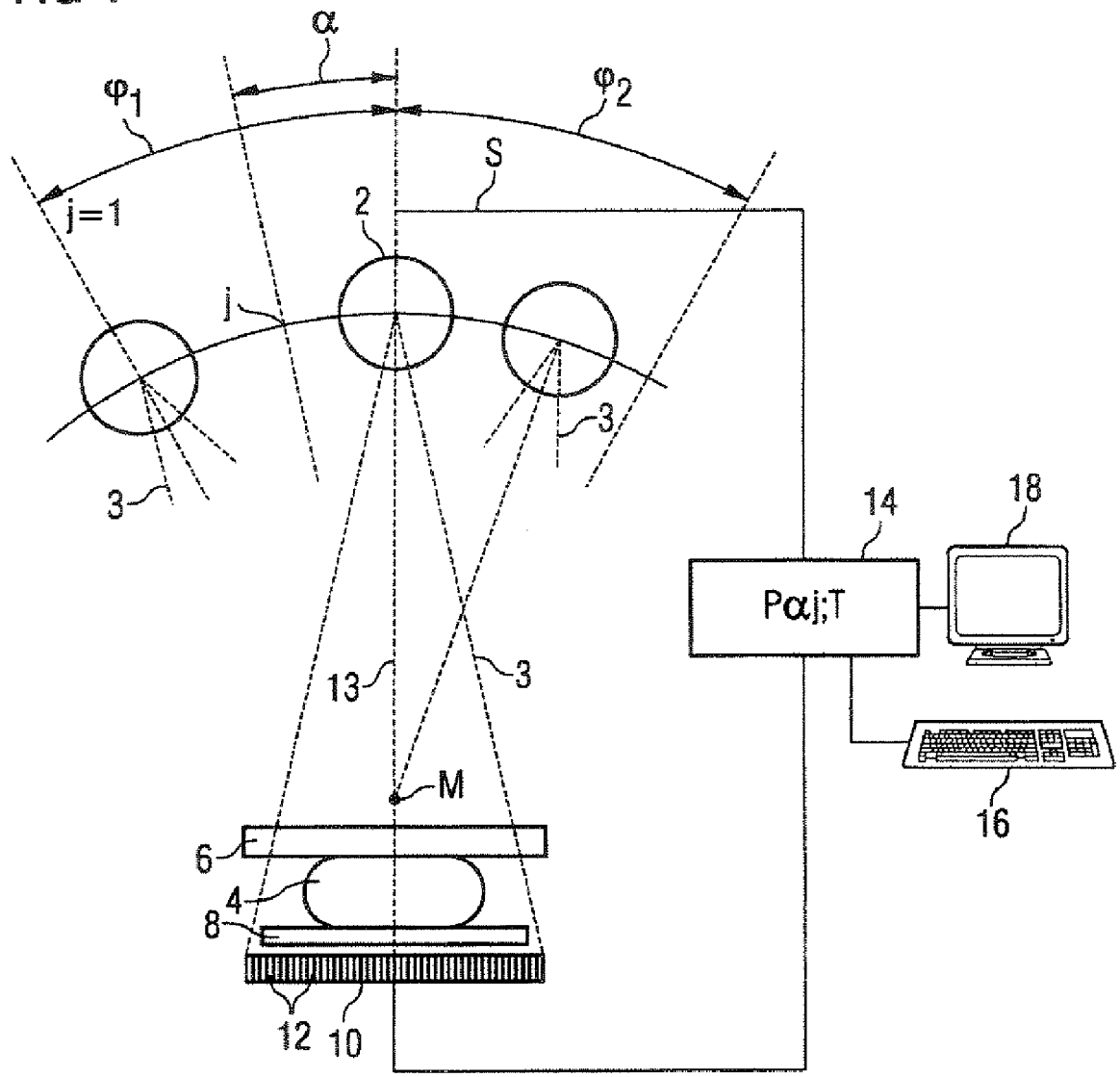

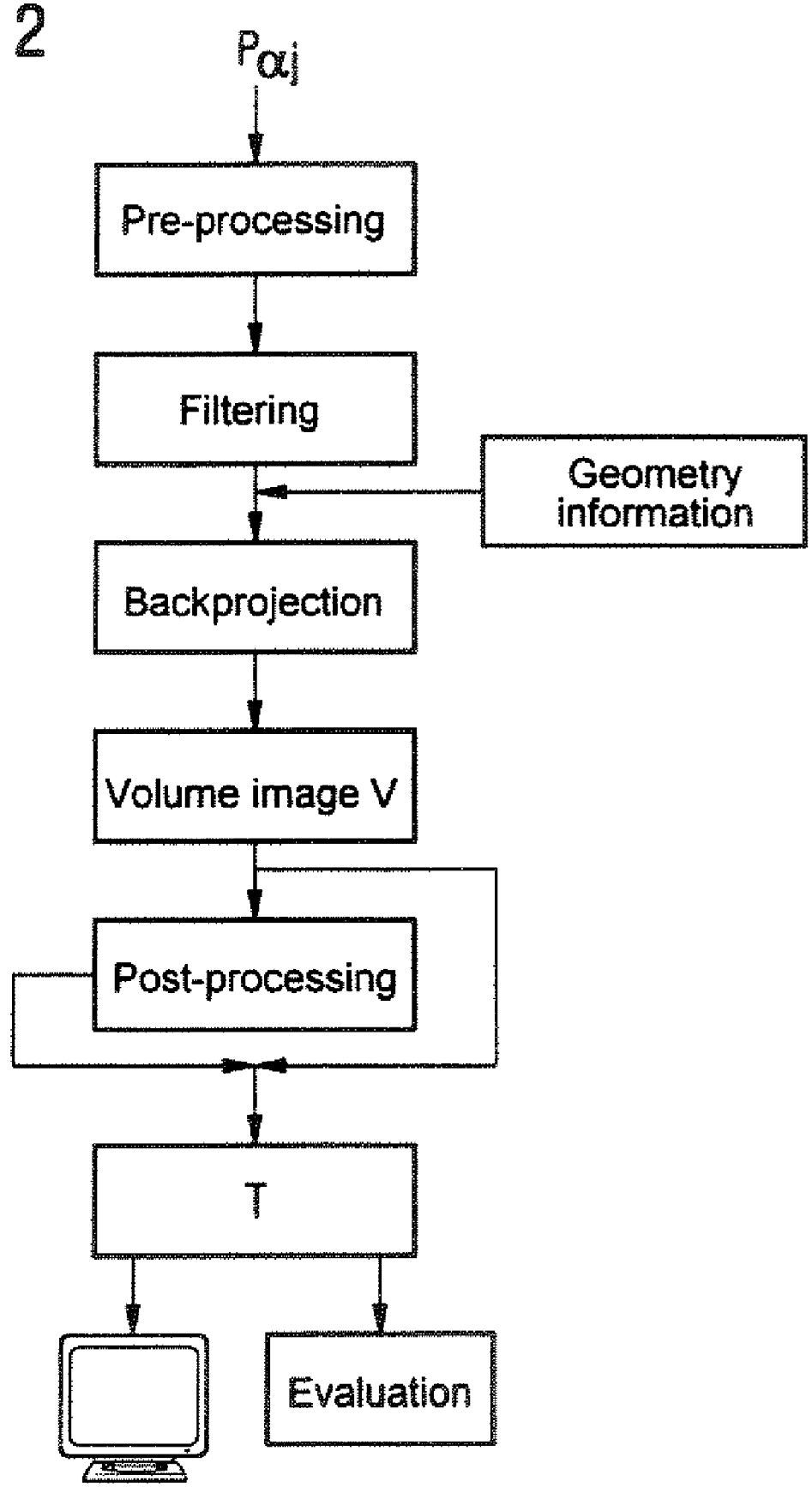

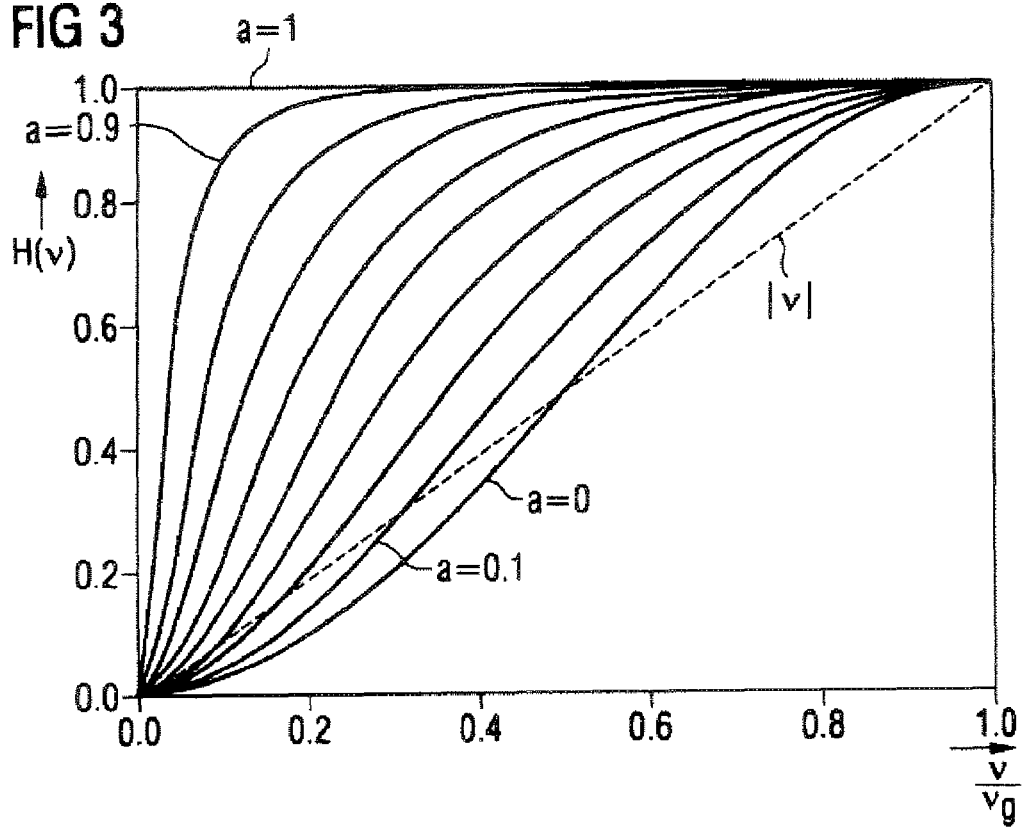
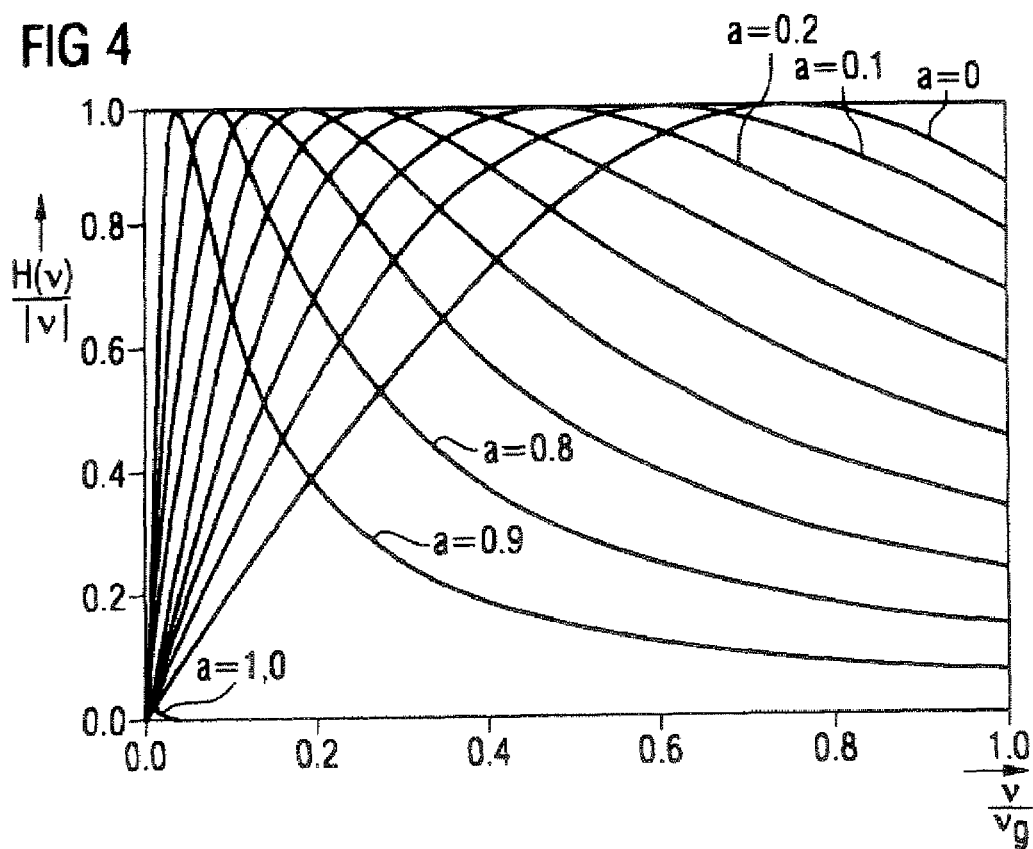

TOMOSYNTHETIC IMAGE RECONSTRUCTION METHOD, AND DIAGNOSTIC DEVICE OPERATING ACCORDING TO THE METHOD

BACKGROUND OF THE INVENTION

1. Field of the Invention

The invention relates to a tomosynthetic image reconstruction method, especially suitable for mammography, in which a tomosynthetic 3D x-ray image is assembled from individual digital images recorded from a number of different projection angles. In addition the invention relates to a diagnostic device operating with such a method.

2. Description of the Prior Art

Mammography involves x-ray examination of the female breast for the purpose of detecting tumors at the earliest possible stage. By constantly improving mammography methods an attempt is made to generate x-ray images supplying a high level of information, in order to distinguish beneficial from harmful changes and to reduce the number of incorrect findings, i.e. the number of suspicious findings that are caused by non-harmful changes, and the number of the undiscovered harmful tumors. In conventional x-ray mammography in this case a two-dimensional single image of the compressed breast is produced in a single projection direction. Since in such a projection the tissue layers lying behind each other in the direction of the x-ray beam are overlaid, heavily-absorbent beneficial structures can overlay a harmful tumor and render such detectability more difficult.

To avoid this, mammography methods known as tomosynthesis are known from Dobbins J T, III, Godfrey D J. "Digital x-ray tomosynthesis: current state of the art and clinical potential", Physics in Medicine and Biology 48, R65-R106, 2003, in which individual images of the female breast or projection data can be recorded in a number of different projection directions with a digital x-ray detector. From these individual digital images recorded from different projection angles, i.e. from the image data belonging to these individual images, a three-dimensional image data set, for example composed of a number of layer images, that each represent one layer of the breast oriented in parallel to the reception surface of the x-ray detector, can be generated by image reconstruction methods. Such an image data set obtained by reconstruction is referred to below as a tomosynthetic 3D x-ray image. This technique enables tissue structures at a lower depth in the direction of propagation of the x-ray beam to be better detected.

Because of the incomplete scanning, i.e. the projections are only available from a restricted angular range, a reconstruction of a 3D x-ray image is only possible to a limited extent, so that the image quality of a tomosynthetic 3D x-ray image does not achieve the image quality known from computed tomography (CT). Thus, for example, the resolution in the direction of the central beam, referred to as the depth resolution, is reduced compared to the resolution in the layers at right angles to this. Also because of the incomplete scanning no quantitative values of the attenuation coefficient $\mu$ can be reconstructed, so that the character or impression of the image obtained with tomosynthesis also differs from the character of an image obtained with computer tomography methods. The imaging task on such cases focuses more in obtaining the best possible three-dimensional visualization of the object under the given projection conditions than on a quantitative reconstruction of the local absorption coefficient $\mu$.

In tomography as well as in tomosynthesis the diagnostic evaluation capability of a reconstructed 3D x-ray image is heavily dependent of the reconstruction algorithms used, which in addition must be optimized with respect to the respective diagnostic problem.

The reconstruction methods known in the prior art for tomosynthesis are for example summarized in the aforementioned article by Dobbins et al. Essentially the methods employ unfiltered back projection (Niklason L T, Christian B T, Niklason L E, et al., "Digital Tomosynthesis in Breast Imaging", Radiology 205, 399-406, 1997), non-linear back projection (Suryanarayanan S, Karellas A, Vedantham S, et al., "Evaluation of Linear and Nonlinear Tomosynthetic Reconstruction Methods in Digital Mammography", Academic Radiology 8, 219-224, 2001), matrix inversion methods (D. J. Godfrey, A. Rader and J. T. Dobbins, III, "Practical Strategies for the Clinical Implementation of Matrix Inversion Tomosynthesis (MITS), Medical Imaging 2003: Physics of Medical Imaging, Proc. SPIE Vol. 5030 (2003), pp. 379-389), iterative (algebraic) methods (Wu T, Stewart A, Stanton M, et al., "Tomographic Mammography Using a Limited Number of Low-dose Cone-beam Projection Images", Medical Physics 30, 365-380, 2003; Wu T, Moore R, Rafferty E A, Kopans D B, "A Comparison of Reconstruction Algorithms for Breast Tomosynthesis", Medical Physics 31, 2636-2647, 2004), and filtered back projection (FBP) (Wu T, Moore R. Rafferty E A, Kopans D B, "A Comparison of Reconstruction Algorithms for Breast Tomosynthesis", Medical Physics 31, 2636-2647, 2004; Lauritsch G, Haerer W H, "A Theoretical Framework for Filtered Backprojection in Tomosynthesis", Proc. SPIE, 3338, 1127-1137, 1998 and U.S. Pat. No. 6,442, 288).

With filtered back projection the measurement data provided by the x-ray detectors is filtered and subsequently projected back onto a volume matrix—the digital three-dimensional image of a part volume of the object. It is one of the most promising reconstruction methods since it is based on an analytical algorithm that can be obtained from the scanning geometry and is numerically very efficient and stable. Previously such methods have essentially used filters which are similar to the filters used in tomographic reconstruction. Thus, in the aforementioned article by Wu et al, for example, a filtered back projection specifically developed by Feldkamp for tomography on orbital paths using a cone-shaped x-ray beam bundle and known as the Feldkamp algorithm Feldkamp et al is applied.

Because of the basically incomplete nature of a tomosynthetic reconstruction in mammography, reconstruction algorithms, as are known from tomography, cannot simply be used for tomosynthetic reconstruction without any problems.

SUMMARY OF THE INVENTION

An object of the invention is to provide a tomosynthesis image reconstruction method, especially for mammography, with which, using minimal processing effort, a 3D x-ray image can be generated that can be evaluated diagnostically in the best possible manner. An object of the invention is also to provide a diagnostic device operatable with such an image reconstruction method.

The first object is achieved in accordance with the invention by an image reconstruction method wherein a tomosynthetic 3D x-ray image is reconstructed by a filtered back projection from a number of individual digital images recorded at different position angles in a restricted angular range, in which filtering is undertaken with a discrete convolution kernel which in the local area outside zero corresponds to an exponential function.

A discrete convolution or filtering is defined by the relationship $$y(n) = \sum_{k=-\infty}^{k=+\infty} h(k)x(n-k),$$

with h(k) being the so-called convolution kernel, x(n) the sequence of the measurement or image data—the intensities of the x-radiation measured in various discrete channels at various discrete angular positions—and y(n) is the series of filtered data generated by the convolution. The inventive discrete convolution kernel—referred to below as the exponential core—is defined in the spatial domain by the following relationship:

$h(0)$ (central value, for $k \to \infty h(0)=1$) applies $h(1)=-(1-a)/2$ $h(k)=h(1)a^{k-1}$ and $h(k)=h(-k)$ for $k<0$ In such cases k is an integer with |k|>1 and corresponds to the spatial variable in parallel to the receiver surface, expressed in units of a spatial distance, for example the distance between two adjacent channels of the x-ray detector, with which, for the discrete inventive convolution or filtering—designated below as exponential filtering—summation is executed instead of an integration.

The parameter "a" can be used to control the character of the image to be reconstructed with regard to contrast, local sharpness and noise behavior. Preferably "a" lies between the values of zero and one. In the limit case of a=0 the convolution kernel corresponds to a Laplace filter, with which only one reconstruction of edges in the image is undertaken (X or λ reconstruction). In the limit case of a=1 the unity core is produced, with which the so-called layergram, i.e. the simple back projection, can be reconstructed.

The filtering can be undertaken both in the spatial domain and also in the frequency domain. To this end the Fourier transforms of the measurement or image data are multiplied by the Fourier transforms of the exponential core and this product is subsequently Fourier back-transformed. Such a procedure, which mathematically leads to the same result produces a simplification of the mathematical operations required and thus speeds up the image reconstruction.

The exponential filtering alternatively can be performed afterwards at data record level on a data record already filtered with another filter, or at image level on a 3D image created with another reconstruction method from this data.

The use of such a convolution kernel (exponential core) corresponding to an exponential function is known for tomography from U.S. Pat. No. 6,125,163, the disclosure of which is incorporated herein by reference. The invention is based on the insight that this known reconstruction method is especially suitable for image reconstruction with incomplete image data sets, as are present in tomosynthesis, since with such an exponential core even projection data available from only one small angular area enable the structures, microcalcification or tumors especially relevant to diagnosis in mammography to be presented so as to be particularly recognizable by the appropriate choice of parameter "a". In other words, by using such an exponential filter, although the object is not reconstructed exactly (quantitative reproduction of the object density) and the emphasis is placed more on the visualization of edge areas, this is of advantage for tomosynthesis, since such quantitative information is in principle not possible because of the incomplete scanning.

The image character can be set to match the problem, e.g. with accentuation of small high-contrast structures on the one hand (for example microcalcifications in mammography), or lower-contrast densities (tumors) on the other hand. This is achieved by the appropriate choice of the factor a, which preferably amounts to around 0.9 for mammography. The option of recursive implementation enables the filtering to be performed extremely quickly.

The exponential drop in the filter coefficients and where necessary the additional shortening of the core length L means that the filter core also decays must more quickly than in normal tomography or tomosynthesis filters. Such short effective core lengths very effectively limit the extent to which data disturbances can propagate in the image. Particularly the problem in tomosynthesis of generally only truncated projections being enabled, in which the projection cone does not completely cover the object under examination, is significantly reduced, since with short cores the assigned image errors can no longer propagate from edge of the image into the interior.

For a convolution kernel h(k) limited to a finite length L it is also of advantage to define the central value h(0) such that the core sum becomes equal to zero $$\sum_{k=-\infty}^{k=+\infty} h(k) = 0, \text{ with } L = 2N+1$$

This is achieved by setting $$h(0) = \sum_{k \neq 0} h(k).$$

Such a zero sum characteristic has proved to be especially advantageous for image quality.

In an advantageous embodiment of the invention the filtering can also be implemented in a recursive form, as is explained in greater detail in U.S. Pat. No. 6,125,163. The result of a convolution with the exponential core defined above is also achieved if the result of an averaged recursive filtering of the order one is subtracted from the result. A recursive filter of the order one is defined by the specification $y(n)=ay(n-1)+bx(n)$ This can be translated into $$y(n) = b\sum_{i=0}^{n-1} a^i \cdot x(n-i)$$

If u(n) is written for the ascending direction and v(n) for the result in the failing direction, the following is obtained $$u(n) = b\sum_{i=0}^{n-1} a^i \cdot x(n-1)$$

-continued and $$v(n) = b\sum_{i=0}^{n-1} a^i \cdot x(n-1).$$

If $$W(n) = c \cdot x(n) - (u(n) - v(n))$$
$$= c \cdot x(n) - 2 \cdot b \cdot x(n) - b\sum_{i>0} a^i(x(n+i) + x(n-i))$$
$$= (c - 2b)x(n) - ba\sum_{i>0} a^{i-1}(x(n+i) + x(n-i))$$

and C is selected as $C=h(0)-1+1/a$ with h(0) as the central component of the exponential filter defined above, as well as $$b = \frac{1-a}{2a},$$

the result is $$W(n) = h(0) \cdot x(n) - \frac{(1-a)}{2}\sum_{i>0} a^{i-1}(x(n+i) + x(n-i))$$

That is the result of a normal convolution with the exponential filter for the parameter a≠0. In the special case a=0 the exponential filter does not need to be implemented recursively since it consists of only three elements.

The above object also is achieved in accordance with the present invention by a diagnostic device for producing a tomosynthetic 3D x-ray image using the reconstruction method in accordance with the invention described above, including the various embodiments. This device has an x-ray tube that is moveable within a restricted range relative to an examination subject, and a digital x-ray detector that records digital projection data at different projection angles of the x-ray beam emitted by the x-ray tube. An evaluation device processes the detector signals to reconstruct the tomosynthetic 3D x-ray image in accordance with one or more embodiments of the image reconstruction method in accordance with the invention, as described above.

DESCRIPTION OF THE DRAWINGS

FIG. 1 schematically illustrates an embodiment of a device in accordance with the invention.

FIG. 2 is a flowchart of an embodiment of the method in accordance with the invention.

FIGS. 3 and 4 are diagrams in which Fourier transforms, or the Fourier transforms of an inventive exponential filter standardized to the Fourier transforms of a ramp filter, are plotted against the standardized local frequency for different parameters "a".

DESCRIPTION OF THE PREFERRED EMBODIMENTS

According to FIG. 1 the device, in the exemplary embodiment a mammography device, has an x-ray tube 2 for generating x-rays beams 3 that pass through an object under examination 4. The object under examination 4 is a female breast which is held between a compression plate 6 and a support plate 8. The x-rays passing through the object under examination 4, the compression plate 6 and the support plate 8 are received by a wide-area digital x-ray detector 10 which is formed by a number of individual detectors 12 arranged in a matrix-shaped array, and of which the receive surface is arranged in parallel to the plates 6, 8.

The x-ray tube 2 is arranged to enable its location to be changed in a restricted area in relation to the object under examination, and can for example within a restricted angular range $\phi_1,\phi_2$ be pivoted around an axis M perpendicular to the beam plane into different angular positions j=1 . . . n, so that individual images of the object under examination 4 at different projection angles $\alpha_j$ relative to the normal 13 of the receive surface of the x-ray detector 10 can be created. The angular range $\phi_1,\phi_2$ does not have to be arranged symmetrically to the normal 13 in this case. These individual images or the projection data $P_{\alpha j}$ assigned to these images in each case are assembled in a control and evaluation unit 14 containing an image processor by reconstruction into a tomosynthetic 3D x-ray image T and displayed on a monitor 18. The x-ray detector 10 does not change its location during the pivoting movement of the x-ray tubes 2. It is also possible however to pivot the x-ray detector 10 as well or to move it so that it follows the pivoting movement of the x-ray tubes 2 in a linear manner.

A movement of the x-ray tubes 2 on a restricted linear path instead of the pivoting movement is also permitted, so that the height difference between x-ray detector 10 and x-ray tubes remains constant. This linear track likewise does not have to run symmetrically to the normal 13. With this linear movement there is an alignment of the x-ray tubes 2 to the object under examination 4, so that in this case as well individual images of the object under examination 4 can be recorded from different angles of projection $\alpha_j$ but in a restricted angular range.

The angular position j, or in the case of a linear movement, the linear position and the alignment of the x-ray tubes 2 as well as their operating parameters is controlled by control signals S which are generated by the control and evaluation unit 14. With the aid of input elements, shown generically in the example by a keyboard 16, different image reconstructions, explained below, can be selected and executed by the user.

The sequence of the reconstruction is illustrated schematically in the flowchart shown in FIG. 2. In a first step the projection data Pαj are subjected to preprocessing, e.g. a logarithmic scaling and a normalization. After this preprocessing the convolution or filtering is undertaken with the convolution kernel h(k) in accordance with the invention. Subsequently, by back projection of all projections, taking into account their recording geometry, e.g. the relevant positions of focus and detector, a volume image V is calculated. This is subjected to further post-processing where necessary, e.g. by means of an image processing program, a filtering or by means of a CAD program (CAD=Computer-Aided-Diagnosis) to allow a software-supported diagnosis. It represents the system-driven only approximately reconstructed spatial distribution of the x-ray absorption coefficients μ and is presented visually as a tomosynthetic 3D x-ray image T either on the screen of a monitor or fed to an automated, software-supported evaluation (diagnose).

The inventive convolution or filtering can also be performed as part of post-processing on a volume image V which has been created by unfiltered back projection or by another reconstruction algorithm instead of on the projections.

The diagram depicted in FIG. 3 plots the Fourier transforms H(v) of the inventive exponential core h(k) for different parameters a against the local frequency v. The Fourier transform H(v) is normalized to its maximum value, the local frequency v to a limit frequency $v_g$ given by length L of the core. In the example the calculation has been performed for an exponential core h(k) of length L=255.

The curve of what is known as the ramp filter |v| is also entered in the diagram. It can now be seen from the diagram that, the extent to which high local frequencies are suppressed can be significantly influenced by the selection of the parameter "a".

The extent to which high local frequencies are suppressed in relation to a ramp filter |v| depending on parameter a, is especially evident in the diagram shown in FIG. 4 in which the Fourier transform H(v) of the exponential core normalized on the ramp filter |v| is plotted for different parameters against the local frequency.

Although modifications and changes may be suggested by those skilled in the art, it is the intention of the inventors to embody within the patent warranted hereon all changes and modifications as reasonably and properly come within the scope of their contribution to the art.

We claim as our invention:

1. A tomosynthetic image reconstruction method, comprising the steps of:
    from a plurality of sets of digital projection data, obtained at different projection angles, within a restricted angular range, of an x-ray beam that penetrates an examination subject to produce the projection data, reconstructing a tomosynthetic 3D image with an image reconstruction procedure; and
    in said image reconstruction procedure, employing a discrete filtered back projection of each of said sets of digital projection data by filtering with a convolution kernel having a central value and a local area outside the central value corresponding to an exponential function.

2. A tomosynthetic image reconstruction method as claimed in claim 1 comprising performing said filtering recursively.

3. A tomosynthetic image reconstruction method as claimed in claim 1 comprising employing a convolution kernel that is restricted to a finite length.

4. A tomosynthetic image reconstruction method as claimed in claim 3 comprising selecting said central value of said convolution kernel to cause a core sum to equal zero in said discrete filtered back projection.

5. An apparatus for producing a tomosynthetic 3D x-ray image, comprising:
    an x-ray tube that emits an x-ray beam moveable through a restricted angular range relative to an examination subject;
    a digital x-ray detector disposed to detect radiation in said x-ray beam, after passing through said examination subject, at a plurality of different projection angles in said restricted range, thereby producing a plurality of sets of digital projection data respectively for said angles; and
    an evaluation device supplied with said plurality of sets of digital projection data, said evaluation device executing a software program to reconstruct a tomosynthetic x-ray image from said plurality of sets of digital projection data by a discrete filtered back projection wherein filtering is performed with a convolution kernel having a central value and corresponding, in a local area outside of said central value, to an exponential function.

6. An apparatus as claimed in claim 5 wherein said evaluation unit executes said software program to perform said filtering recursively.

7. An apparatus as claimed in claim 5 wherein said evaluation unit employs, in said software program, a convolution kernel that is restricted to a finite length.

8. An apparatus as claimed in claim 5 wherein said evaluation unit, in said software program, selects said convolution kernel to cause a core sum of said convolution kernel to be equal to zero in said discrete filtered back projection.

* * * * *